US010566002B1

(12) United States Patent
Kamen et al.

(10) Patent No.: US 10,566,002 B1
(45) **Date of Patent: *Feb. 18, 2020**

(54) SYSTEM AND METHOD FOR IDENTIFYING AND PROCESSING AUDIO SIGNALS

(71) Applicant: DEKA Products Limited Partnership, Manchester, NH (US)

(72) Inventors: Dean Kamen, Bedford, NH (US); Derek G. Kane, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,673

(22) Filed: Nov. 13, 2017

Related U.S. Application Data

(62) Division of application No. 13/450,739, filed on Apr. 19, 2012, now Pat. No. 9,818,416.

(Continued)

(51) Int. Cl.

*G10L 15/04* (2013.01)
*G10L 19/02* (2013.01)
*G10L 21/038* (2013.01)
*H04M 3/493* (2006.01)
*G10L 15/187* (2013.01)

(52) U.S. Cl.

CPC ............ *G10L 19/02* (2013.01); *G10L 15/187* (2013.01); *G10L 21/038* (2013.01); *H04M 3/4938* (2013.01)

(58) Field of Classification Search

CPC ..... G10L 19/02; G10L 21/038; G10L 15/187; G10L 15/02; G10L 15/063; G10L 13/08; G10L 13/04; G10L 13/10; G10L 13/033; G06F 17/289; G06F 17/2872; G09B 21/009; H04M 3/4938; H04M 2201/40

USPC ....... 704/254, 258, 271, 278, 221, 265, 266, 704/267, 268, 270, 270.1, 275, 203; 434/185, 169, 118

See application file for complete search history.

(56) References Cited

U.S. PATENT DOCUMENTS 4,727,582 A * 2/1988 de Vries ............... H04R 25/604 381/322

4,813,076 A * 3/1989 Miller ..................... G10L 15/02 704/254

(Continued)

OTHER PUBLICATIONS

Ambikarajah, "Emerging Features for Speaker recognition", IEEE 6th International Conference on Information , Communication & Signal processing,ICICS, 2007, pp. 1-7. (Year: 2007).*

(Continued)

*Primary Examiner* — Vijay B Chawan
(74) *Attorney, Agent, or Firm* — Michelle Saquet Temple

(57) ABSTRACT

A method for phoneme identification. The method includes receiving an audio signal from a speaker, performing initial processing comprising filtering the audio signal to remove audio features, the initial processing resulting in a modified audio signal, transmitting the modified audio signal to a phoneme identification method and a phoneme replacement method to further process the modified audio signal, and transmitting the modified audio signal to a speaker. Also, a system for identifying and processing audio signals. The system includes at least one speaker, at least one microphone, and at least one processor, wherein the processor processes audio signals received using a method for phoneme replacement.

16 Claims, 25 Drawing Sheets

Learning Method
Broadcast Method
Transmit audio stream/ signal
To Speaker
Phoneme replacement method
A)Time slot
B)Phoneme
Phoneme Identification Method
From Microphone
Audio pre-processor
Broadcast Method

Related U.S. Application Data

(60) Provisional application No. 61/479,993, filed on Apr. 28, 2011, provisional application No. 61/477,002, filed on Apr. 19, 2011.

(56) References Cited

U.S. PATENT DOCUMENTS

| | | | | |
|---|---|---|---|---|
| 4,820,059 | A * | 4/1989 | Miller | G10L 15/04 704/238 |
| 5,813,862 | A * | 9/1998 | Merzenich | G09B 5/065 434/118 |
| 6,071,123 | A * | 6/2000 | Tallal | G09B 5/065 434/116 |
| 6,123,548 | A * | 9/2000 | Tallal | G09B 5/065 434/118 |
| 6,862,558 | B2 * | 3/2005 | Huang | G06F 17/14 702/179 |
| 8,095,364 | B2 * | 1/2012 | Longe | G10L 15/24 704/257 |
| 2002/0048374 | A1 * | 4/2002 | Soli | H04R 25/30 381/60 |
| 2005/0065784 | A1 * | 3/2005 | McAulay | G10L 19/093 704/205 |
| 2005/0185798 | A1 * | 8/2005 | Camey | H04R 25/356 381/60 |
| 2006/0177799 | A9 * | 8/2006 | Stuart | G09B 19/04 434/112 |
| 2006/0276856 | A1 * | 12/2006 | Soli | H04R 25/30 607/57 |
| 2007/0010999 | A1 * | 1/2007 | Klein | G10L 19/04 704/211 |
| 2009/0257536 | A1 * | 10/2009 | Grbic | G10L 21/0208 375/350 |
| 2011/0046948 | A1 * | 2/2011 | Pedersen | G10L 21/0208 704/231 |
| 2011/0178799 | A1 * | 7/2011 | Allen | G10L 21/0364 704/226 |

OTHER PUBLICATIONS

Hou et al., "A New Approach to Extract Formant Instantaneous Characteristics for Speaker Identification", International Journal of Computer Information Systems and Industrial Management Applications (IJCISIM), vol. 1,2009, pp. 295-302. (Year: 2009).*

* cited by examiner

SYSTEM AND METHOD FOR IDENTIFYING AND PROCESSING AUDIO SIGNALS

CROSS REFERENCE TO RELATED APPLICATION

The present application is a divisional of U.S. patent application Ser. No. 13/450,739, filed Apr. 19, 2012 and entitled System and Method for Identifying and Processing Audio Signals, which is now U.S. Pat. No. 9,818,416 issued Nov. 14, 2017, which is a Non-Provisional Application which claims the benefit of U.S. Provisional Patent Application Ser. No. 61/477,002, filed Apr. 19, 2011 and entitled System and Method for Identifying and Processing Audio Signals, and U.S. Provisional Patent Application Ser. No. 61/479,993, filed Apr. 28, 2011 and entitled System and Method for Identifying and Processing Audio Signals, each of which are hereby incorporated herein by reference in their entireties.

TECHNICAL FIELD

The present disclosure relates to audio signals and more particularly, to systems and methods for identifying and processing audio signals.

BACKGROUND

Hearing loss includes loss of the ability to distinguish between various phonemes. This includes difficulty with distinguishing consonants, for example, distinguishing "chicken" from "thicken". Therefore, a method for identifying and distinguishing phonemes is desirable. Also, a method for distinguishing various signals, whether audio, mechanical, biological, seismic and/or ultrasound signals is desirable.

SUMMARY

In accordance with one aspect of the present invention, a method for phoneme identification is disclosed. The method includes receiving an audio signal from a speaker, performing initial processing comprising filtering the audio signal to remove audio features, the initial processing resulting in a modified audio signal, transmitting the modified audio signal to a phoneme identification method and a phoneme replacement method to further process the modified audio signal, and transmitting the modified audio signal to a speaker.

Some embodiments of this aspect of the invention may include one or more of the following. Wherein the phoneme identification method comprising analyzing the modified audio signal using a Hilbert-Huang transform method. Wherein the phoneme identification method comprising identifying a time slot occupied by a phoneme and identifying the phoneme in the modified audio signal. Wherein the method further includes transmitting the time slot and the identified phoneme to the phoneme replacement method. Wherein the phoneme replacement method includes determining whether the identified phoneme in the audio stream is a replaceable phoneme and, if the identified phoneme in the audio stream is a replaceable phoneme, replacing the identified phoneme in the modified audio signal with a replacement signal. Wherein replacing the identified phoneme includes receiving the replacement signal from a table and determining a way to smoothly incorporate this sound into the modified audio signal. Wherein replacing the identified phoneme further comprising transmitting the modified audio signal to a speaker. Wherein filtering comprising digitally filtering the extreme values of the audio signal. Wherein the initial processing includes processing the signal and finding the maxima and minima of the signal, passing the maxima to a high-pass filter, filtering the maxima using a high pass filter to produce a filtered signal, sampling the filtered signal, applying an interpolation function to the sampled filtered signal to find the values between the last point and the current point, and determining the difference between the sampled filtered signal and the signal.

In accordance with one aspect of the present invention, a system for processing audio signals is disclosed. The system includes at least one speaker, at least one microphone, and at least one processor, wherein the processor processes audio signals received using a method for phoneme replacement.

Some embodiments of this aspect of the invention may include one or more of the following. Wherein the processor produces an audio stream. Wherein the processor receives an audio signal from the at least one speaker and performs initial processing. Wherein the processing comprising filtering to remove noise. Wherein processing includes filtering to remove audio features. Wherein the audio stream is processed by a phoneme identification method and a phoneme replacement method. Wherein the phoneme replacement method includes a learning method that includes monitoring the audio signal and the background noise and providing feedback to a broadcast method. Wherein the system further includes a classification method for enhancing the accuracy of phoneme identification. Wherein the phoneme replacement method includes a learning method including monitoring the audio signal and the background noise, and providing feedback to a broadcast method and wherein the broadcast method includes enhancing the audio signal and providing information to a classification method.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein.

DETAILED DESCRIPTION OF THE EXEMPLARY EMBODIMENTS

The systems and methods include systems and methods for identifying phonemes and replacing the phoneme with something that may be distinguished by a user which may include, but is not limited to, one or more of the following: audio signal, and/or vibratory signal. The system and methods include transmitting and/or broadcasting the replacement signal.

Figure 1:
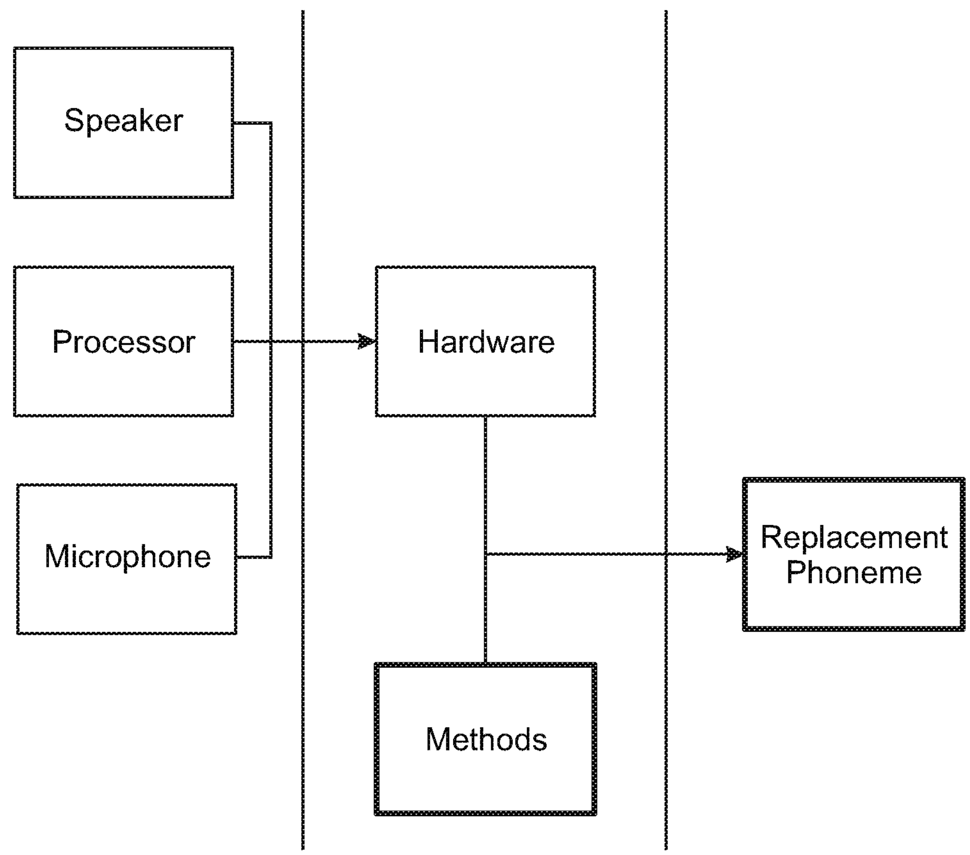
FIG. 1 Is a top-level breakdown of the replacement phoneme system according to one embodiment.

In various embodiments, the system and methods may include at least one microphone, at least one speaker and at least one processor (See FIG. 1). The processor, in some embodiments, includes instructions for a machine which implements methods/instructions including one or more for processing audio signals. In various embodiments, the processor processes at least one audio signal and transmits the processed signal.

Figure 2:
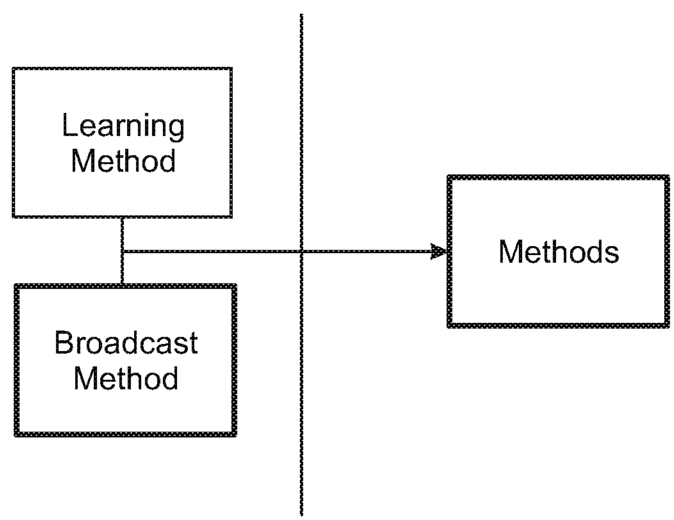
FIG. 2 is an illustrative chart of the division of the software.

Referring now to FIG. 2, in some embodiments, the methods/instructions may include at least two components, a learning method and a broadcast method. The learning method may monitor the audio signal and the background noise. It may provide feedback to the broadcast method to enhance the performance of the traditional filtering in the system. In addition, it may provide information which may be used by classification methods to enhance the accuracy of phoneme identification. Finally, the learning method may assist the software which puts together the signal to be played to the user, ensuring it flows smoothly and minimizes distracting artifacts.

In some embodiments, the processor includes instructions for a machine which, when implemented, causes the processor to implement one or more of the following methods. These may include where the method identifies phonemes and includes phoneme replacement. Also, these may include where the system includes a learning method (s) which may monitor the audio signals and background noise. In some embodiments, the system may provide information which may be used by classification methods to enhance the accuracy of phoneme identification. In some embodiments, the phoneme identification methods may assist the methods/instructions which processes the audio signals and sends the audio signals to the at least one speaker.

Figure 3:
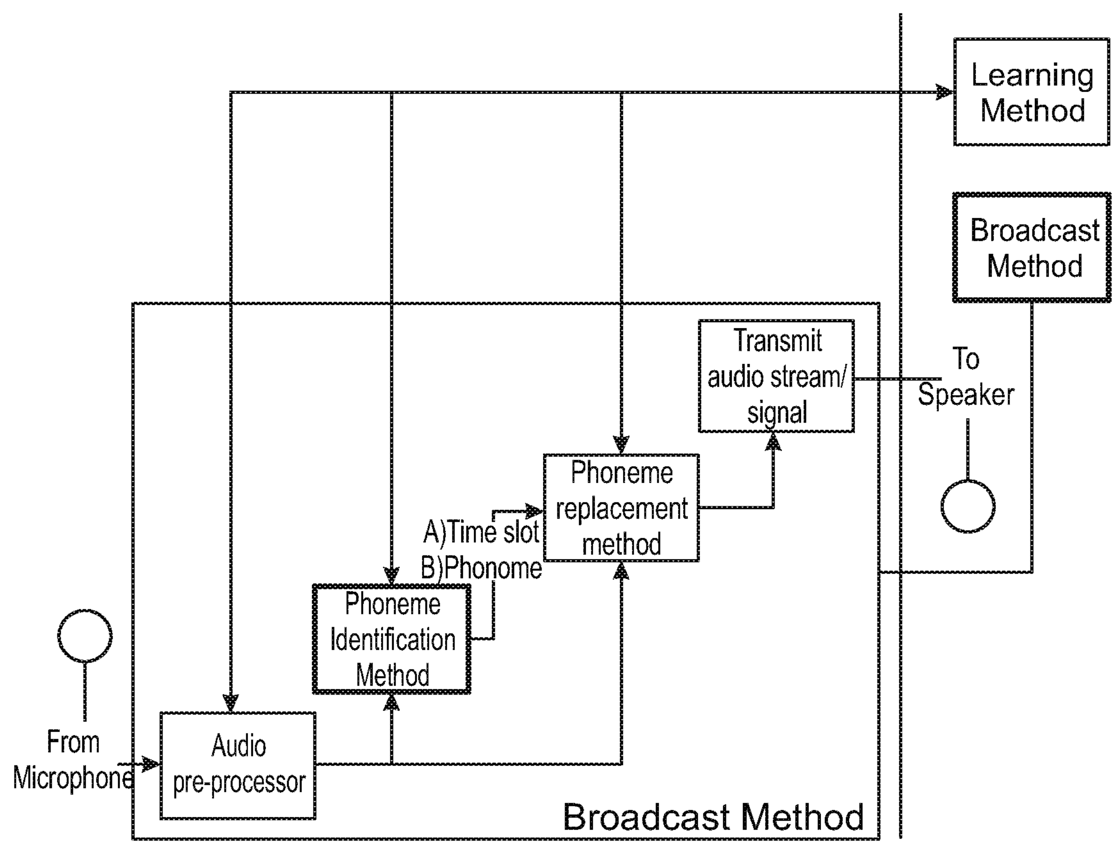
FIG. 3 is an illustrative chart of one embodiment of the broadcast method.

In some embodiments, and referring now to FIG. 3, the processor receives an audio signal from a speaker and performs initial processing. The processing may include conventional filtering intended to remove noise and, in some embodiments, remove audio features that may disrupt later steps. The audio stream, in some embodiments, may be fed to both a phoneme identification method and a phoneme replacement method.

In some embodiments, the Hilbert-Huang transform ("HHT") may be used as part of the phoneme identification method. The whole sub-function identifies the time slot occupied by a phoneme and the particular phoneme being uttered. It passes these pieces of information to the phoneme replacement method.

In some embodiments, the phoneme replacement method determines whether the current phoneme in the audio stream needs to be replaced. In some embodiments, the method includes pulling or receiving the replacement sound from a table and determining a way to smoothly incorporate this sound into the audio. The new signal is then passed on to a standard method for playing the audio through the attached speaker.

As FIG. 3 shows, in some embodiments, there is two-way communication between the broadcast method's audio preprocessor, phoneme identification method, and phoneme replacement method on one side and the learning method on the other. In some embodiments, knowledge of the audio stream history beyond the scope of the broadcast method may be used by each of these sub-functions. The preprocessor filter settings may benefit from in depth characterization of the noise background. In some embodiments, the phoneme identification method may use an analysis of likely next phonemes to improve selection accuracy. Similarly, in some embodiments, the phoneme replacement method may merge the replacement sounds more smoothly with knowledge of past sounds and likely future sounds.

Figure 4:
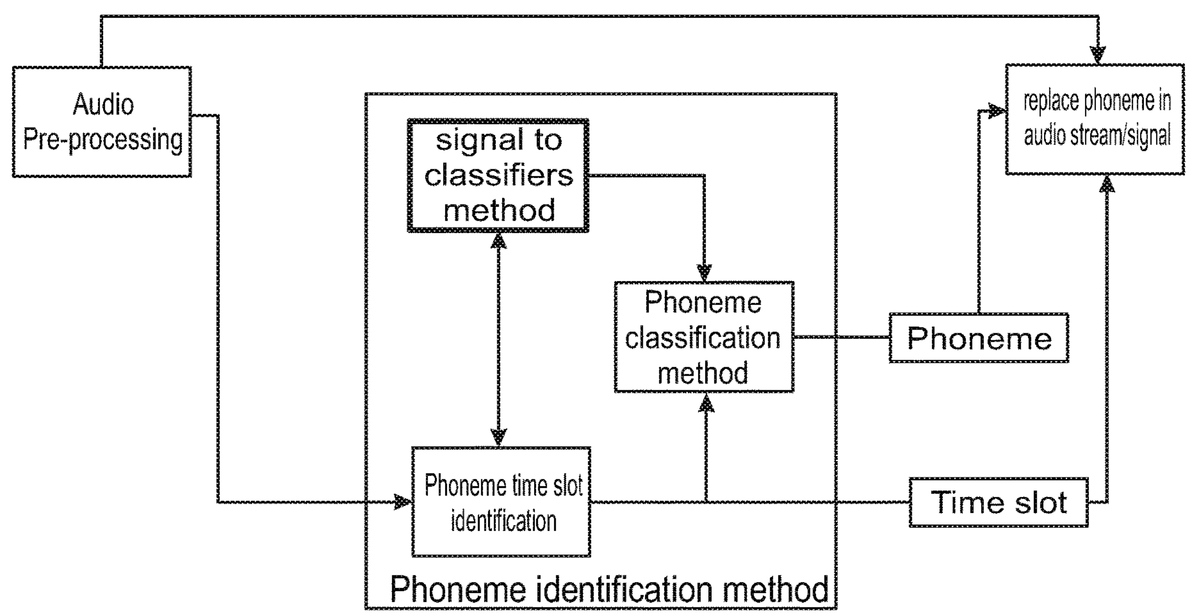
FIG. 4 is an illustrative chart of one embodiment of the phoneme method.

In some embodiments, a phoneme identification method may have three components, see FIG. 4. In some embodiments, the phoneme classification method decides what phoneme is currently in the audio stream based upon a set of characteristics that are currently present in the audio stream. The particular method to determine the phoneme from the classifiers may, in some embodiments, be a clustering method. The final decision is passed onto the method which merges the replacement sounds into the audio stream In some embodiments, the signal to classifiers method provides the bulk of the classifiers required by the phoneme classification method. In some embodiments, the instantaneous amplitude, phase, and frequency of the oscillatory components of the audio signal may be included in the classifiers. The HHT may be advantageous for many reasons, including, but not limited to, because of its ability to characterize instantaneous amplitude, frequency, and phase more cleanly than Fourier or wavelet methods. The classification method/process may provide feedback to the signal-to-classifiers method/process. In some embodiments, the information may allow classifiers to be ignored or refined, for example to lower the computational load.

In some embodiments, the third component of the phoneme identification method identifies the time slot occupied by a phoneme. In some embodiments, this is passed to the phoneme replacement method, so that it knows where to insert the replacement sounds. In some embodiments, the information is also passed to the classification method, so that it only looks at classifiers associated with a single phoneme. This method may also help avoid confusion during transitions between phonemes. In various embodiments, the signal-to-classifier method and the time-slot method exchange information as well. The classifiers may be necessary to identify the time occupied by a phoneme. At the same time information about the timing of the phoneme may be useful for implementing the HHT method.

The Hilbert-Huang transform ("HHT") is disclosed in a 1998 paper, *The empirical mode decomposition and the Hilbert spectrum for nonlinear and non-stationary time series analysis*, by Norden Huang, et. al., which is hereby incorporated herein by reference in its entirety. This paper further developed ideas published in a 1996 paper, *The mechanism for frequency downshift in nonlinear wave evolution*, also by Huang, et. al., which is hereby incorporated herein by reference in its entirety.

This HHT has numerous advantages over other methods of signal analysis. It explicitly works with non-linear and non-stationary functions. Fourier methods assume fixed, linear combinations of sinusoids. Thus, the Fourier coefficients exist at all frequencies when describing a pulse. In addition, the traditional Fourier transform does not easily localize a signal in time. Wavelet analysis offers a method to locally characterize the frequency characteristics of a signal, but they use a constrained time scale and assume linear combinations. The HHT offers many advantages, including, but not limited to, the ability to identify the characteristics of the oscillatory components of a signal. Thus, the HHT is suited for identifying the characteristics of an audio signal. Speech is a non-stationary composition of frequencies. HHT may effectively characterize consonants, which are more impulsive and noise-like than vowels.

HHT Method

Figure 5:
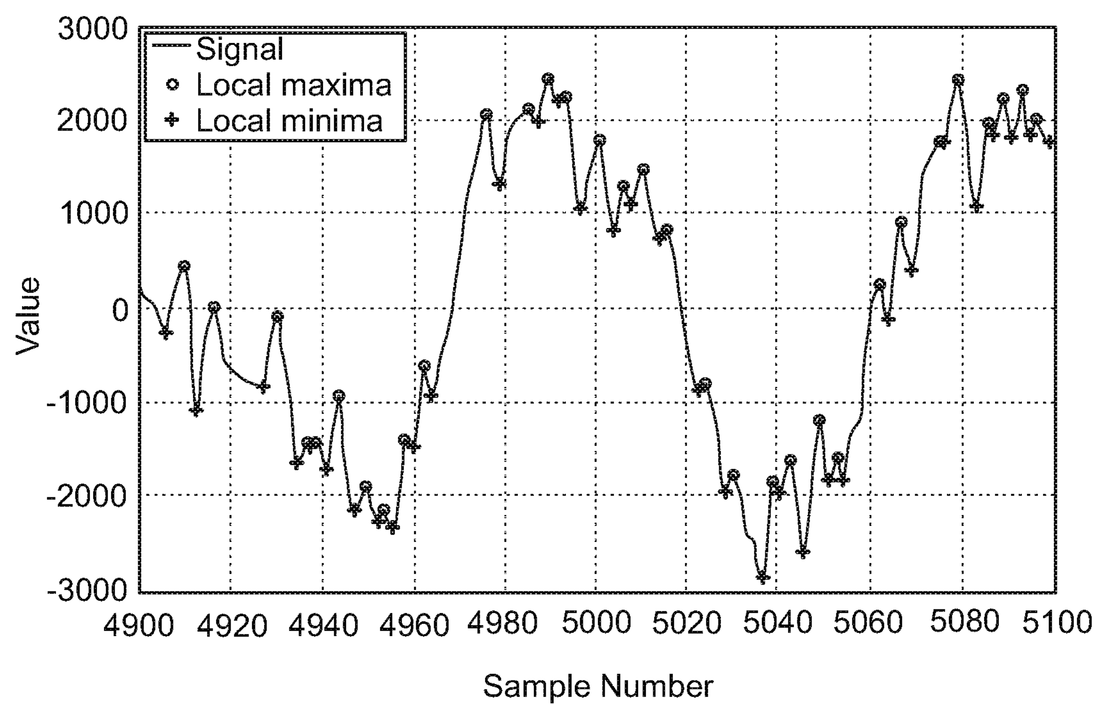
FIG. 5 is a graph showing a signal, maxima and minima according to one embodiment.
Figure 6:
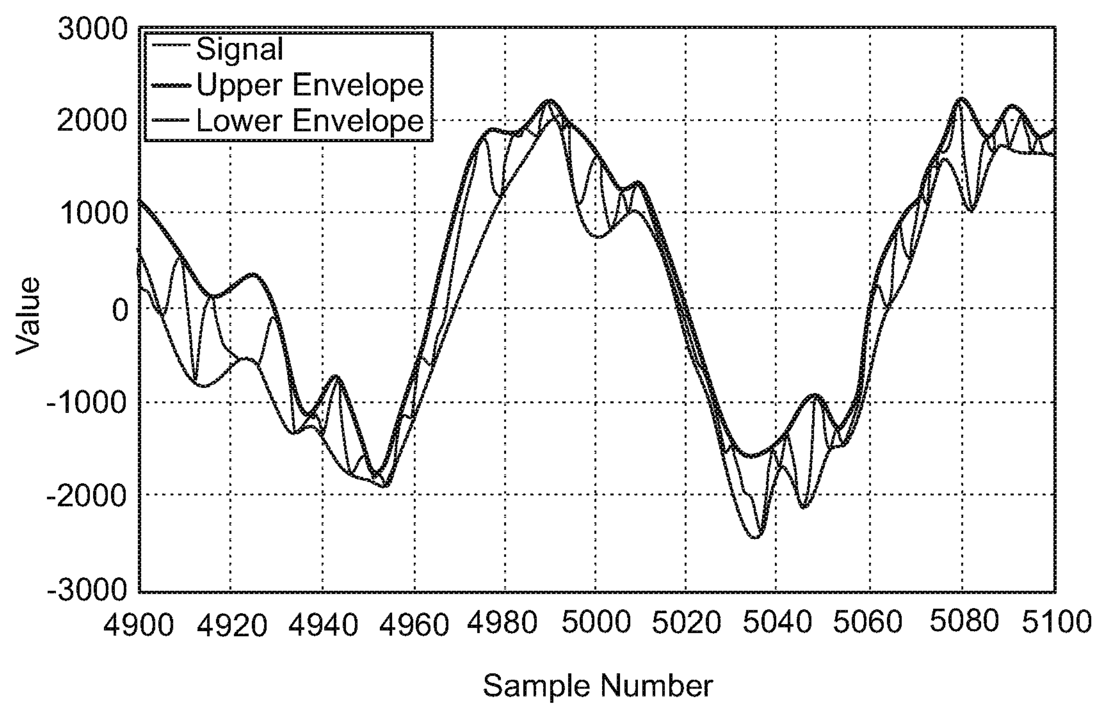
FIG. 6 is a graph showing a signal, upper envelope, lower envelope and mean function according to one embodiment.
Figure 7:
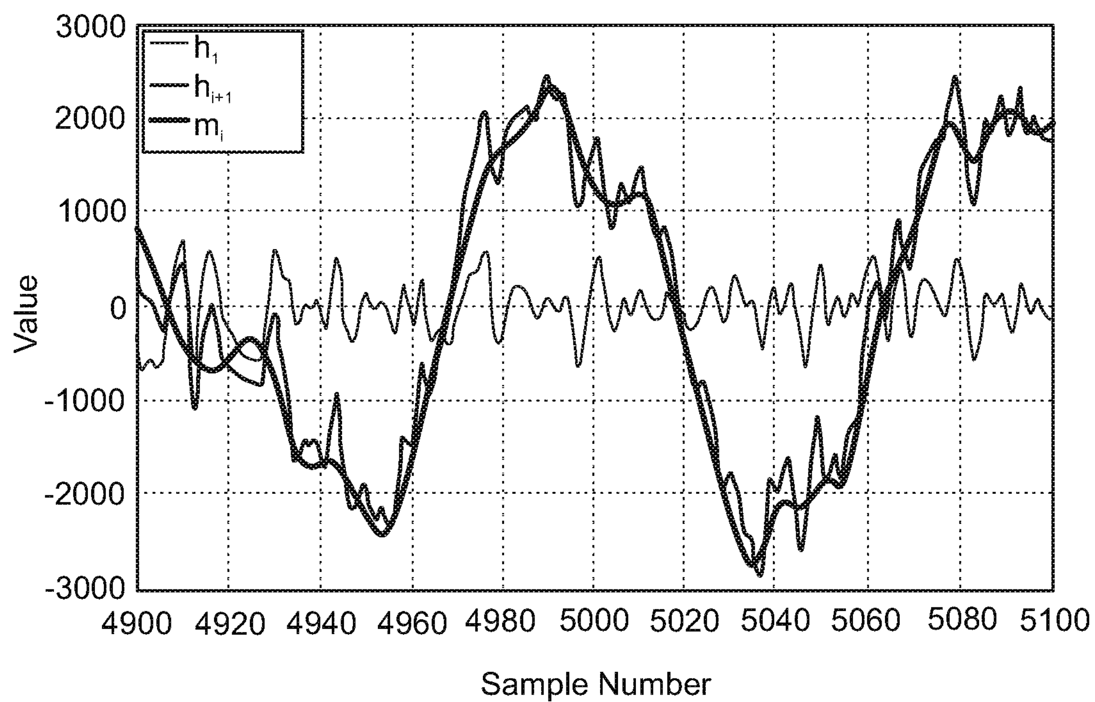
FIG. 7 is a graph showing an iteration of a signal from $h_i$ to $h_{i+1}$ through sifting method according to one embodiment.
Figure 8:
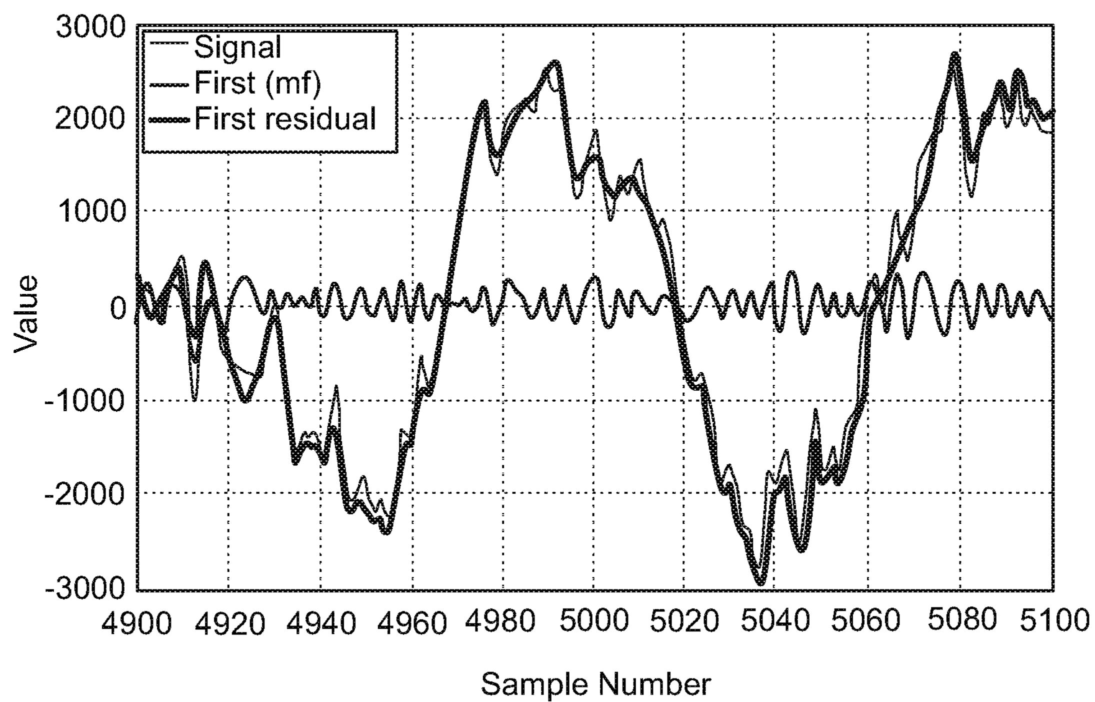
FIG. 8 is a graph showing first IMF and residual signals using 64 iterations of the sifting method according to one embodiment.

HHT identifies the highest frequency oscillatory component in a signal. By defining a function, which approximates the local mean of the signal, and subtracting this from the signal, an estimate of the highest frequency function and the residual may be determined. Once an acceptable estimate of the highest frequency component is determined, that component is assigned as the next intrinsic mode function ("IMF"). The residual is then further analyzed. The HHT method consists of the following steps:

1) Start with a sampled function, s(k)
2) Set $h_0(k)=s(k)$
3) Identify the local maxima and local minima in the current sampled function $h_i$, where i indicates the current iteration of the sifting method, FIG. 5.
4) Use a (cubic) spline to create an estimate of the upper and lower envelope of the signal's amplitude, See FIG. 6. (Note: in this figure the end points of the signal are considered to be local maxima and local minima.)
5) Take the average of the upper and lower envelope at each sample point to find a local mean function, $m_i$, See FIG. 6.
6) Subtract the mean function, $m_i$, from $h_i$ to get the next sampled function $h_{i+1}$, FIG. 7.
7) Evaluate the sifting stopping criteria:
   a) If they are not met, return to Step 3)
   b) If the stopping criteria are met, set the $j^{th}$ intrinsic mode function (IMF) to be equal to $h_i$ ($c_j=h_i$), FIG. 8.
8) Evaluate the IMF stopping criteria:
   a) If they are not met, set $h_0=h_i-c_j$ and return to Step 3)
   b) If they are met, halt.
9) Evaluate each IMF using the Hilbert transform to obtain the instantaneous amplitude, frequency and phase.

The HHT method described above and the papers/books of Norden Huang use one of two criteria for stopping the sifting method (Step 3 through Step 7). The first looks at the ratio of change in the IMF since the last iteration and stops when the difference is less than some threshold value. The second looks at the number of zero crossings compared with the number of extrema in the IMF. When these differ by at most one for some number of iterations, the method stops. However, if these stopping criteria are ignored, the method does not appear to have a natural stopping point.

Figure 9:
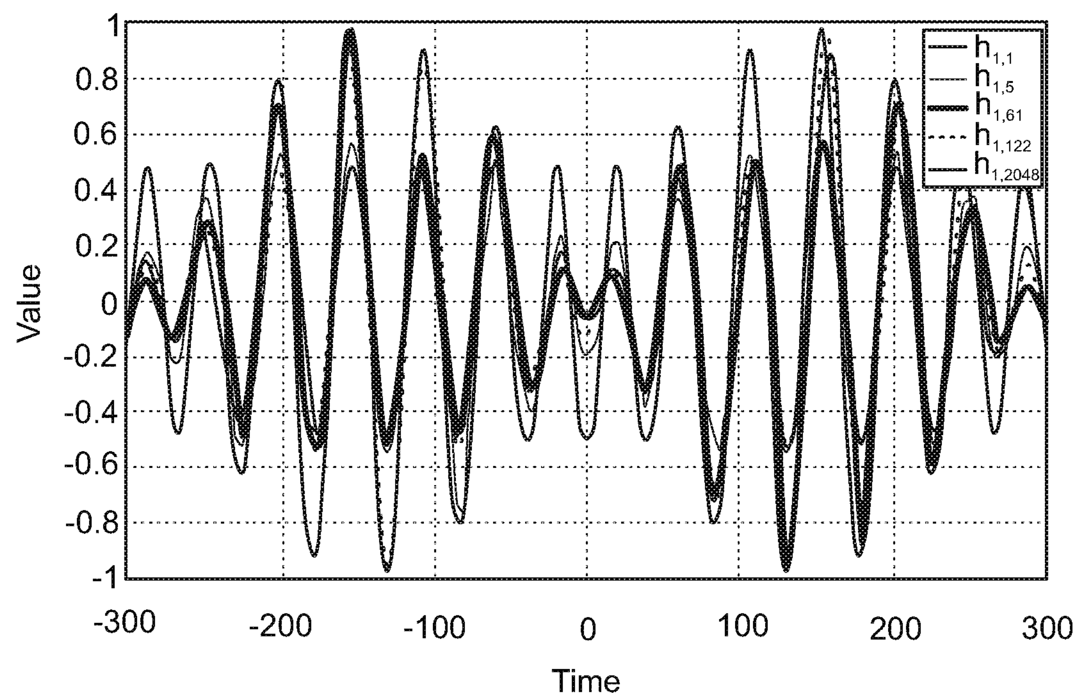
FIG. 9 is a graph showing the results of the sifting method, $h_{1k}$ indicates the first IMF component and the $k^{th}$ iteration through the sifting method.

FIG. 9 shows the progression of the IMF estimate for a simple amplitude modulated signal. Although the desired behavior would be to stop after the first iteration, the method seems to transform the IMF into a sinusoid of uniform amplitude. The method displayed this behavior for every signal tried.

Since it takes hundreds or thousands of iterations for the system to progress to uniform amplitude, while the stopping criteria would be satisfied after tens of iterations; this behavior would appear to have little practical significance. However, without a natural stopping point that makes physical sense it is difficult to believe that the method's selection of an IMF is correct or even approximately optimal.

Figure 10:
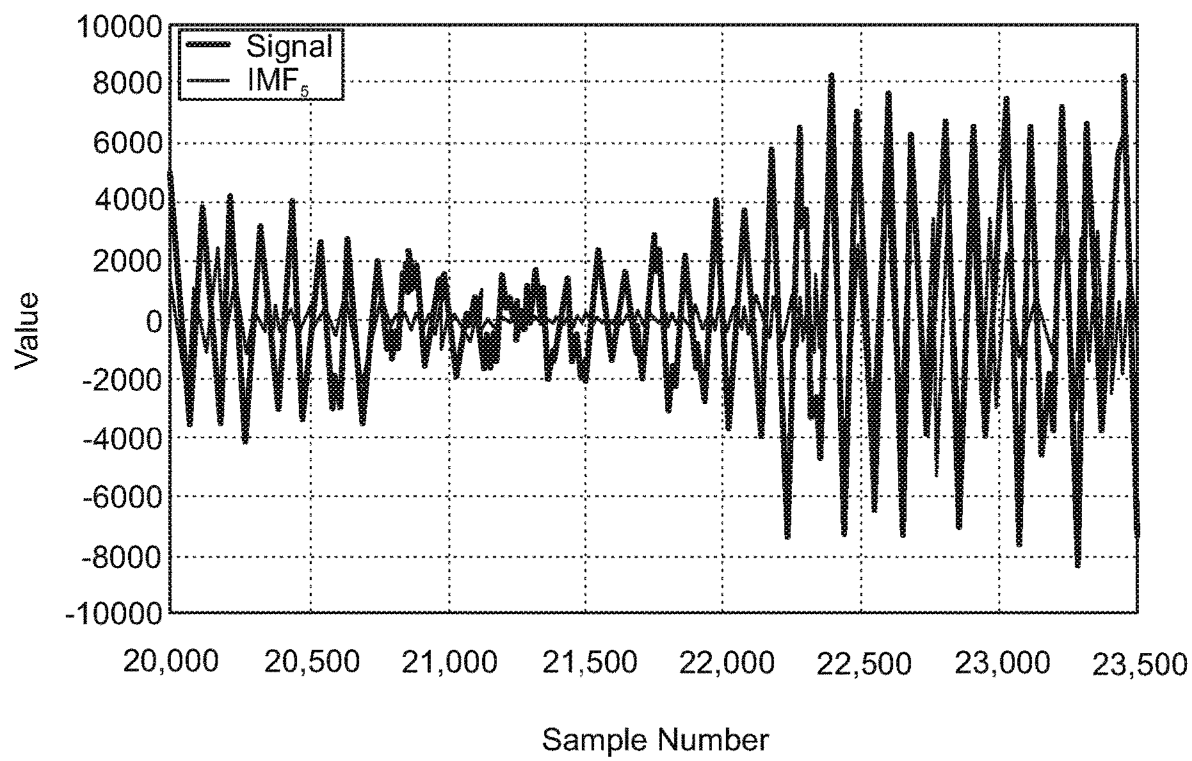
FIG. 10 is a graph showing the fifth IMF and original signal according to one embodiment.

In some embodiments, the HHT may be modified and the modified method may work essentially as a sifting function in that the method smoothly settles into a final, fixed IMF. A smoothly decreasing change function results. Also, the IMFs have the shape intuitively expected, as shown in FIG. 10. It may be seen that the IMF mimics the amplitude and underlying frequency of the signal. Thus, a modified HHT may improve the existing HHT method and also simplify the HHT method and make it more computationally tractable. The traditional EMD method acts as a repetitively applied high pass filter function.

In some embodiments, a modified HHT method may be used in many applications in addition to the ones described above. These may include, but are not limited to, biological signals, e.g., ECG, EEG, respiration, myoelectric signals, etc.; mechanical signals, e.g., vibration, impulse response, etc; and/or seismic or ultrasound signals.

Figure 11:
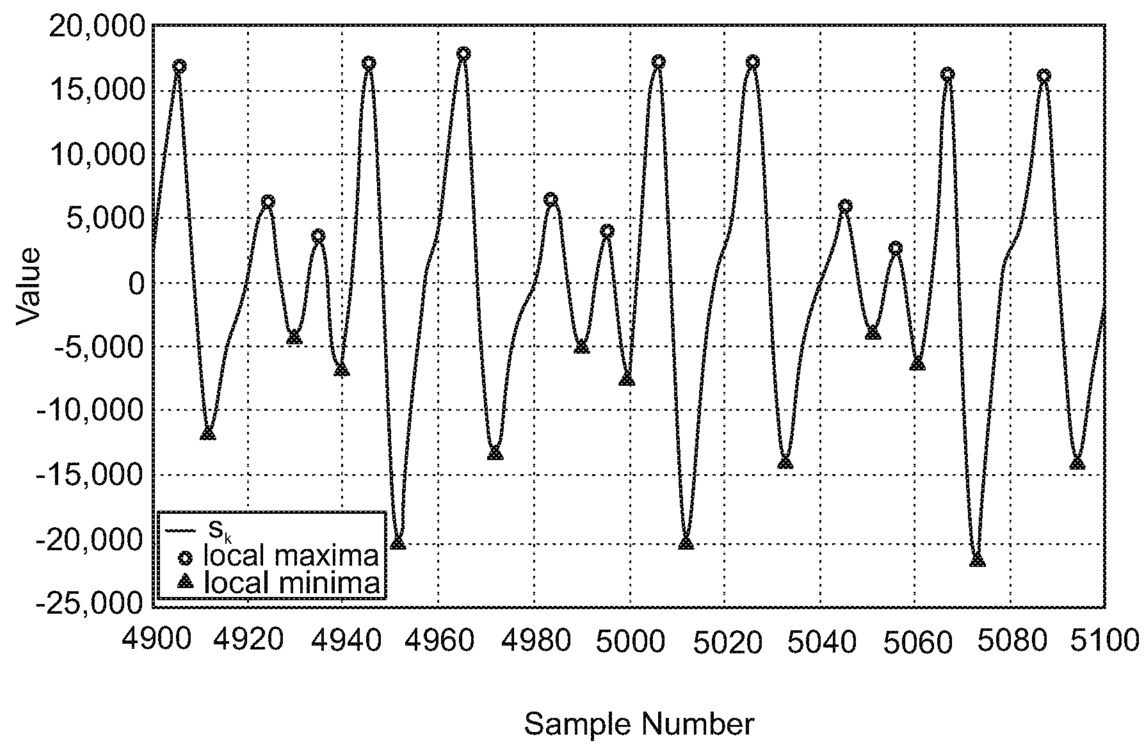
FIG. 11 is a graph showing signal maxima and minima.
Figure 12:
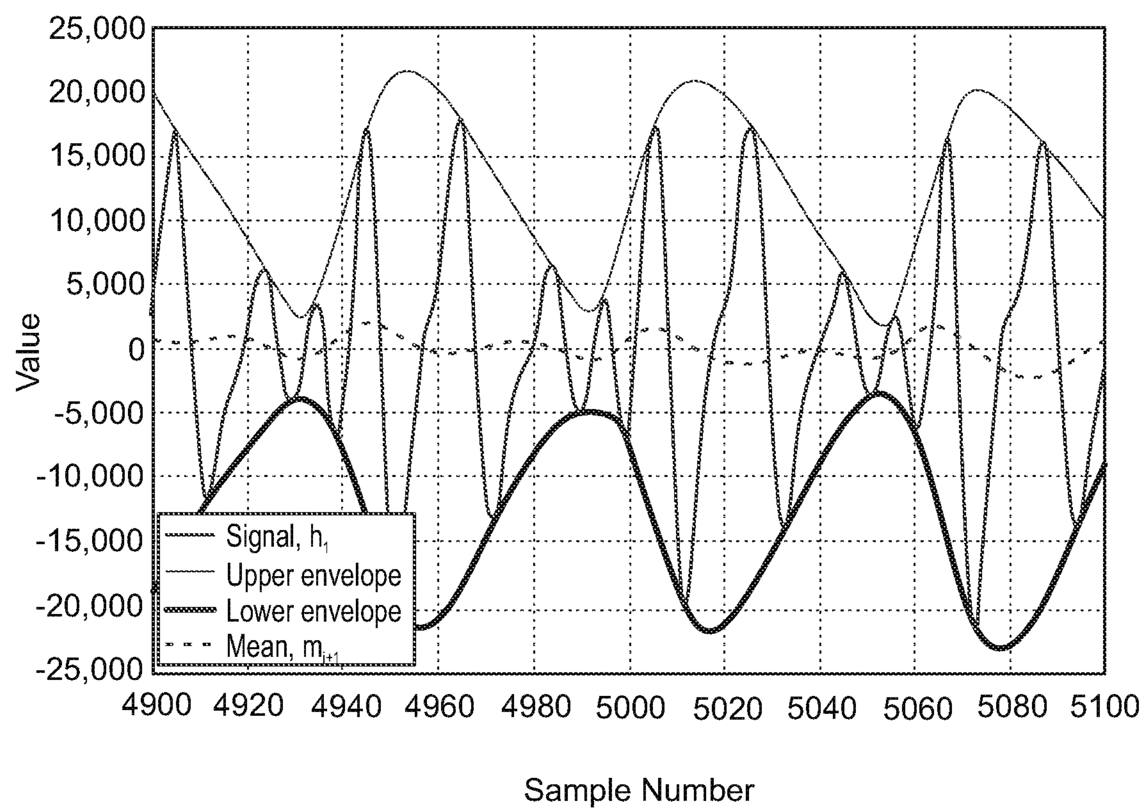
FIG. 12 is a graph showing a signal, upper envelope, lower envelope and mean function.
Figure 13:
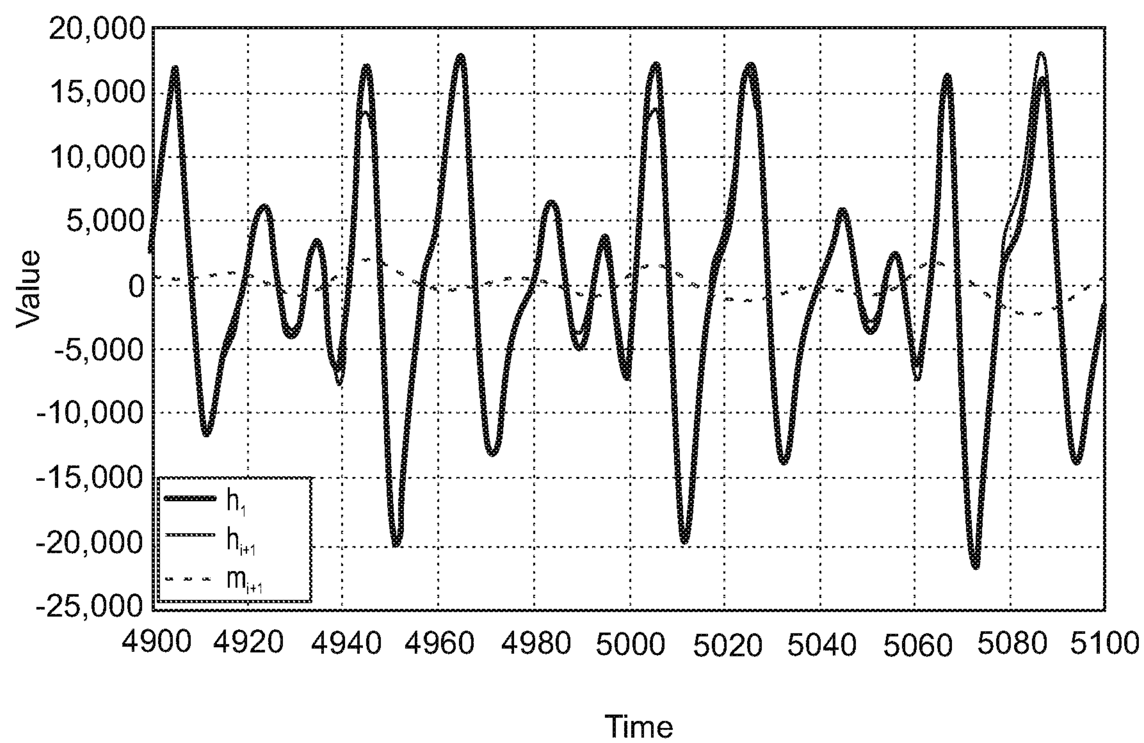
FIG. 13 is a graph showing an iteration of signal from $h_i$ to $h_{i+1}$ through sifting method.
Figure 14:
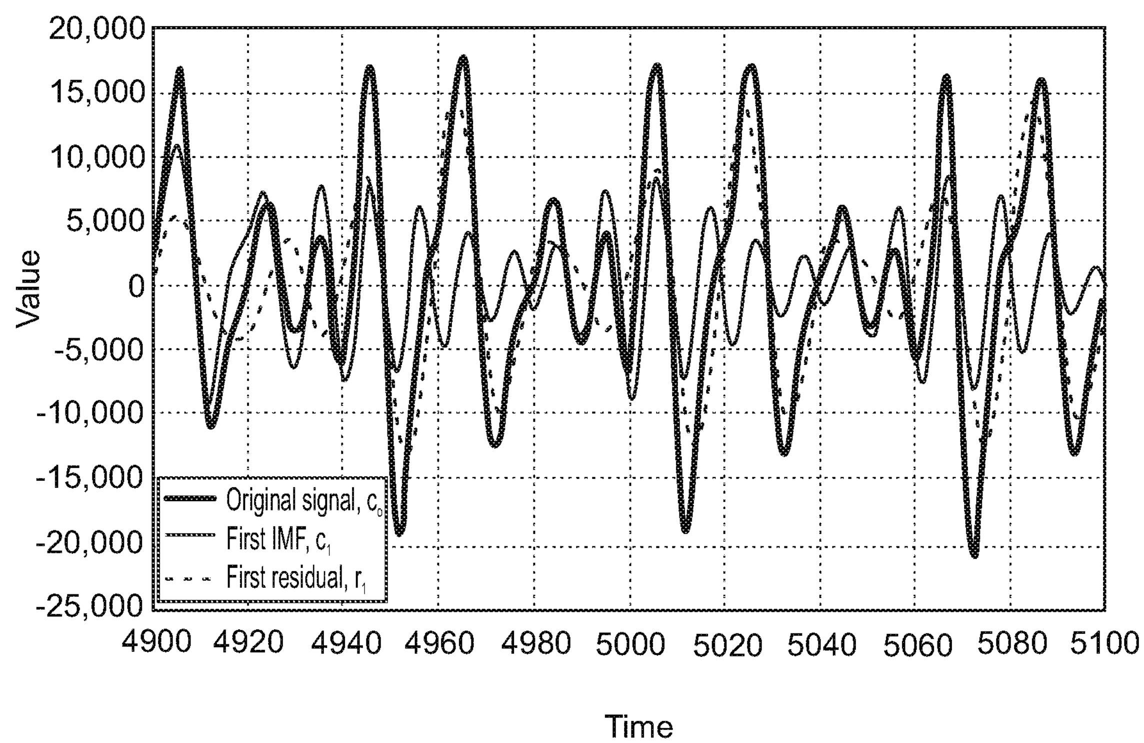
FIG. 14 is a graph showing first IMF and residual signals using 64 iterations of the sifting method.

The traditional EMD method includes the following steps:

1) Start with a sampled function, s(k).
2) Set $h_0(k)=s(k)$.
3) Identify the local maxima and local minima in the current sampled function $h_i$, where i indicates the current iteration of the sifting method, FIG. 11.
4) Use a cubic spline to create an estimate of the upper and lower envelope of the signal's amplitude, FIG. 12.
5) Take the average of the upper and lower envelope at each sample point to find a local mean function, $m_i$, FIG. 12.
6) Subtract the mean function, $m_i$, from $h_i$ to get the next sampled function $h_{i+1}$, FIG. 13.
7) Evaluate the sifting stopping criteria:
   a) If they are not met, return to Step 3)
   b) If the stopping criteria are met, set the $j^{th}$ IMF to be equal to $h_i$($c_j=h_i$), FIG. 14.
8) Evaluate the IMF stopping criteria:
   a) If they are not met, set $h_0=h_i-c_j$ and return to Step 3)
   b) If they are met, halt.

The traditional EMD method acts largely by high-pass filtering the extreme points of a sampled function. It has a secondary effect of increasing the number of extrema in the function. The stopping conditions for the Sifting Method, Step 3) through Step 7), may vary in various embodiments. In some embodiments of the traditional EMD method halting may occur when the number of extreme points and the number of zero crossings in the residual function $h_i$ are within one of each other for 3 to 5 iterations. In some embodiments, however, the iterations continue until the change in the residual signal is acceptably small, e.g. the criterion of the equation below:

$$\varepsilon > \sqrt{\frac{\operatorname{var}(h_{i+1} - h_i)}{\operatorname{var}(h_i)}} \quad \text{EQN. 1}$$

The EMD method in some embodiments may present challenges for use in some situations because of the need for using the entire signal and the time it takes to process the data. For example, with respect to signal processing, in some embodiments, the method depends upon creating spline functions from extreme data from the entire signal. This means that the traditional EMD method may only be used as a post-processing technique once a signal of interest has been gathered. Also, the method may then be too slow for various uses. The traditional method may, in some embodiments, fail to achieve either halting criterion for the first IMF before being stopped.

Real-Time EMD Method

Figure 15:
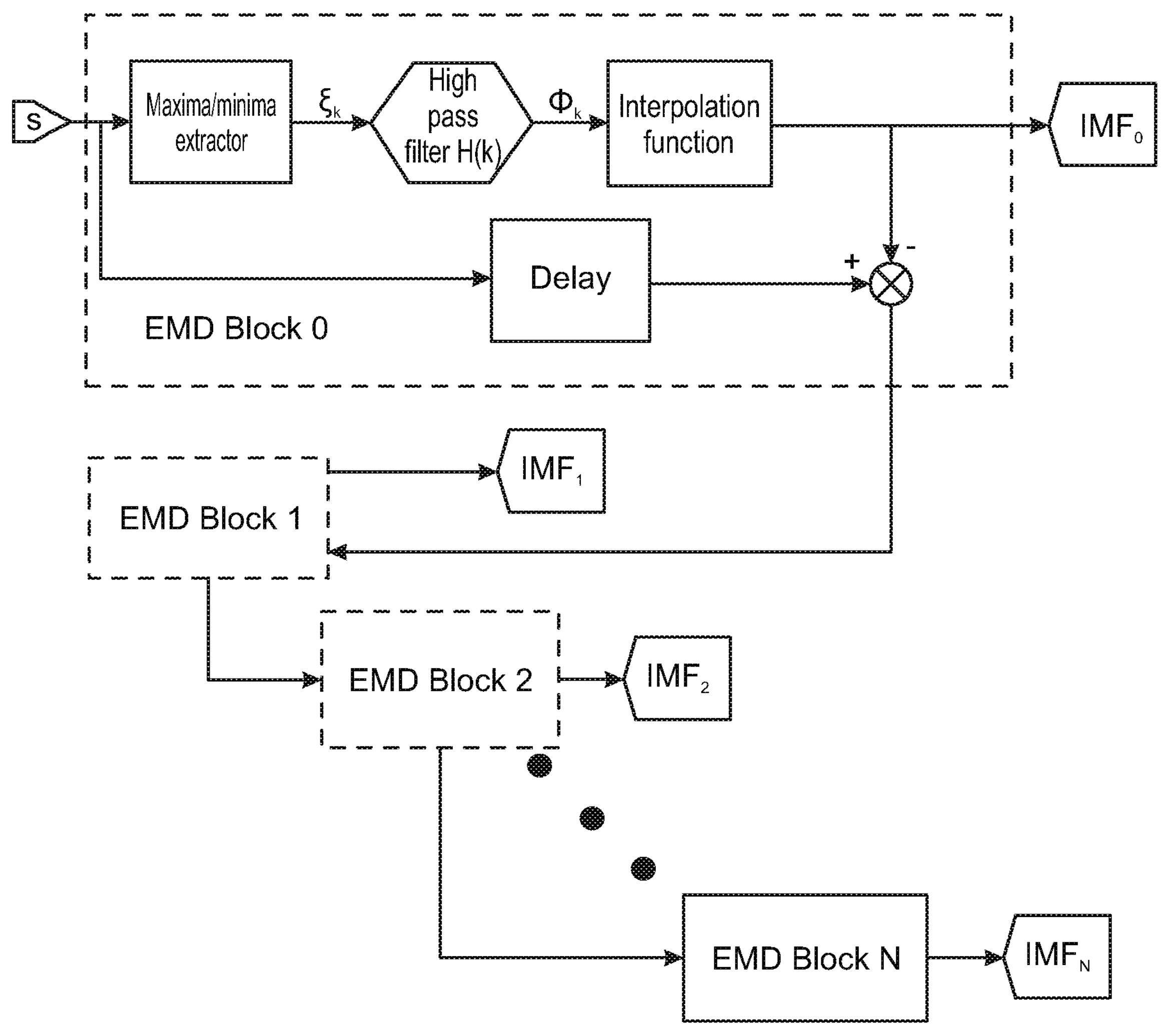
FIG. 15 is a block diagram of the filter-based EMD method implemented as a real-time process.

Since the traditional EMD method behaves much like a high pass filter on the extreme values of the signal, in some embodiments, an EMD-like method may be used using a digital filter on the extreme values of the function. FIG. 15 shows one-embodiments/implementation of this method.

The signal, s, passes into EMD Block 0. In the EMD block, the signal, s, enters a function which finds the maxima and minima of the signal. Whenever a new extreme value is found, it is passed as the next entry to a high-pass filter, H(k). The output of the filter, φ(k), is the next sampled value of the IMF. An interpolation function is applied to the samples to find the values between the last point, φ(k−1), and the current point, φ(k). This interpolated function is $IMF_0$. It is subtracted from the original signal, which has been appropriately delayed and the difference is passed to EMD Block 1. EMD Block 1 will perform the same method, in some embodiments, using a different high-pass filter, and pass its difference signal on to the next EMD block. The EMD blocks, in some embodiments, may be stacked to achieve the desired decomposition of the function. This method may have many advantages, including, but not limited to, using a high-pass filter in the EMD method requires only a single iteration of the sifting method to achieve results analogous to the traditional EMD method.

Figure 16:
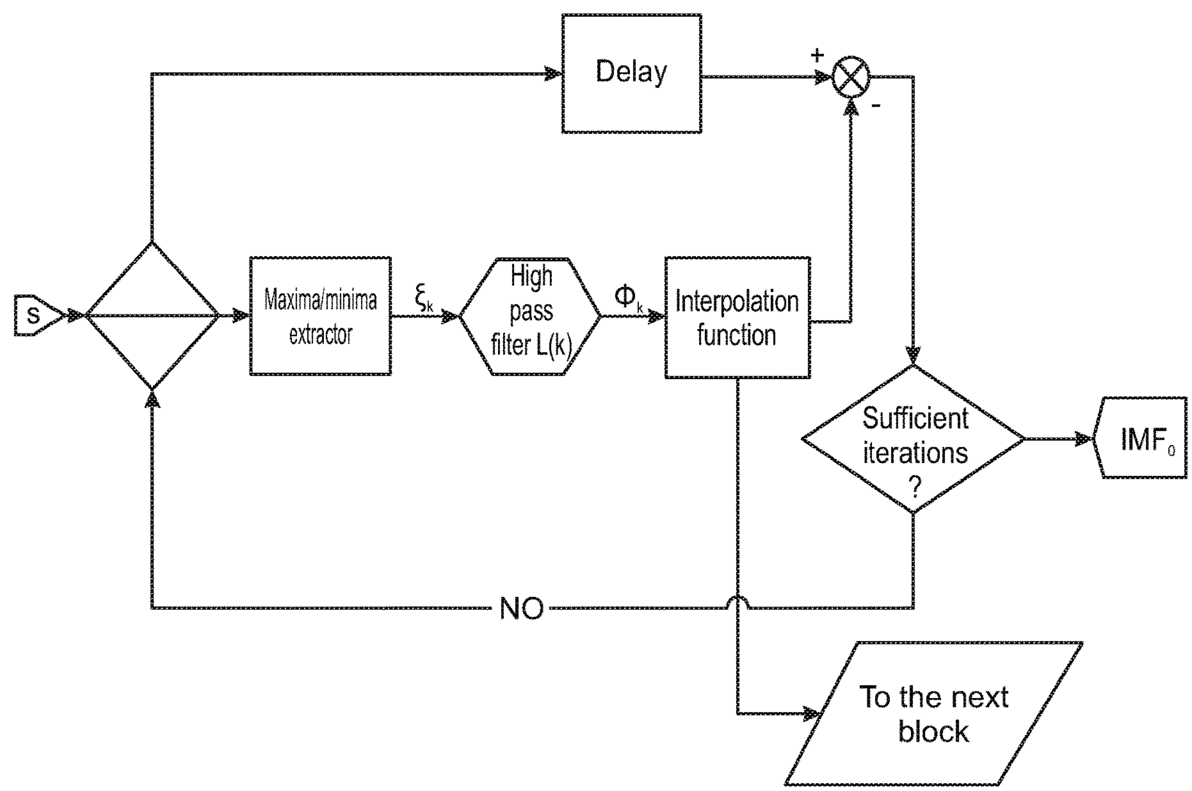
FIG. 16 is a block diagram of the filter-based EMD method using a low pass filter implemented as a real-time process.
Figure 17:
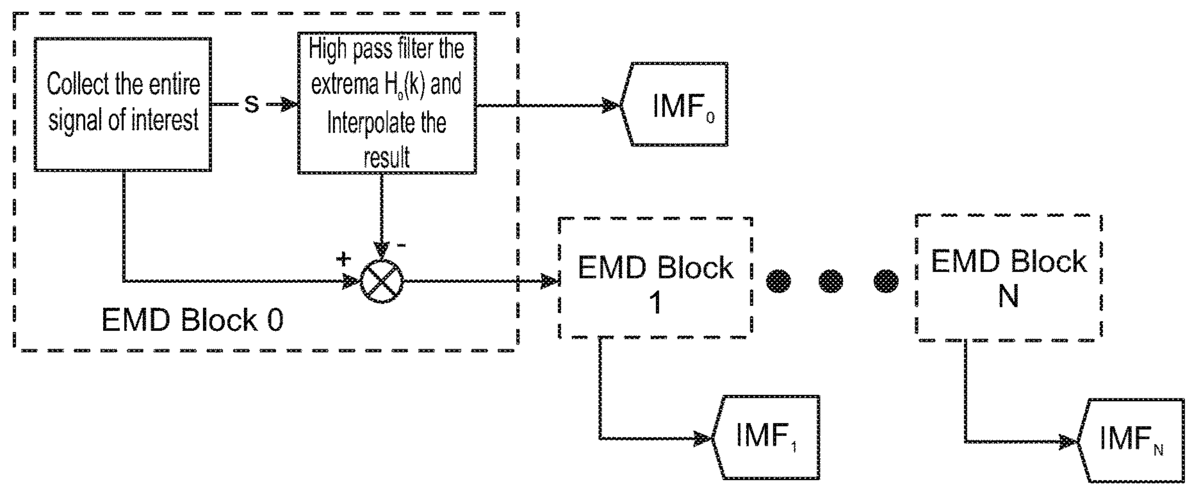
FIG. 17 is a block diagram showing a post-processing high-pass filter EMD.
Figure 18:
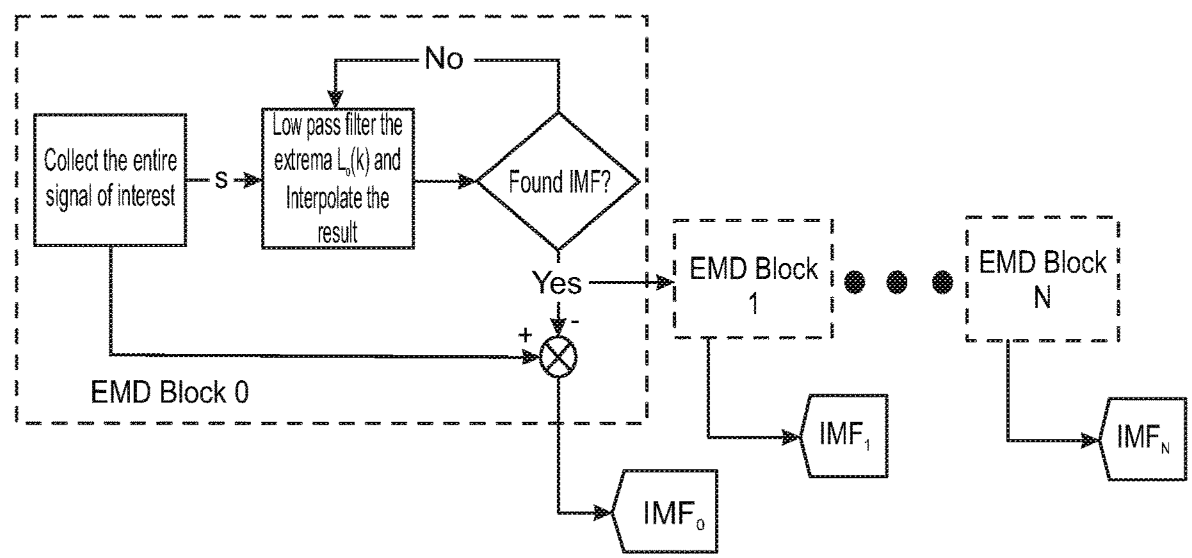
FIG. 18 is a block diagram showing a post-processing high-pass filter EMD.

The traditional method implements its high-pass filter by a low pass filter which is subtracted from the original signal. The resulting difference signal is then low-pass filtered again. In some embodiments, the filter-based EMD mimics this approach. FIG. 16 shows one embodiments of this method being implemented as a real-time process. One difference between this implementation/method and the traditional EMD method is that data is processed as it is received and that the Low Pass filter may be tailored to achieve a variety of effects. This is distinguished from the traditional EMD method where it remains with the low-pass filter imposed by the method. The diagram in FIG. 16 represents one EMD Block which may be cascaded as shown in FIG. 15. In FIG. 16 the difference signal is fed back to the maxima/minima finding method as a new signal. Only after completing a sufficient number of iterative loops is the difference function considered to be the IMF, while the output of the interpolation function is the new signal to feed to the next EMD block. In various embodiments, this feedback loop gives the Filter EMD the hidden maxima finding property of the traditional and method.

This same iterative approach of FIG. 16 may be used to implement the traditional method as real-time processes.

Post-Processing EMD Filter

Both of the methods shown in FIG. 15 and FIG. 16 may be used, in various embodiments, as post-processing methods. In these embodiments, the complete set of maxima and minima are filtered all at once.

In various embodiments, these post-processing methods are substantially similar to the real-time methods, except that the entire data set is collected before applying the method. In various embodiments, the particular filter used in any of the described implementations does not have to be low-pass or high-pass. In some embodiments, this method may include using alternate filters, which may include, but are not limited to, a band-pass filter, to separate a signal into component waveforms.

There may be various benefits to using this post-processing method. These include, but are not limited to, ability to analyze and evaluate the filter EMD without concern with edge effects or filter warm up. In the following example, the Filter EMD has been applied to both an analytic signal:

$$s(k) = \sin\left(2\pi\frac{k}{911}\right) + \cos\left(2\pi\frac{k}{1001}\right) + \sin\left(2\pi\frac{t}{1493}\right) \quad \text{EQN. 2}$$

and to an 18 second segment of recorded speech.

Figure 19:
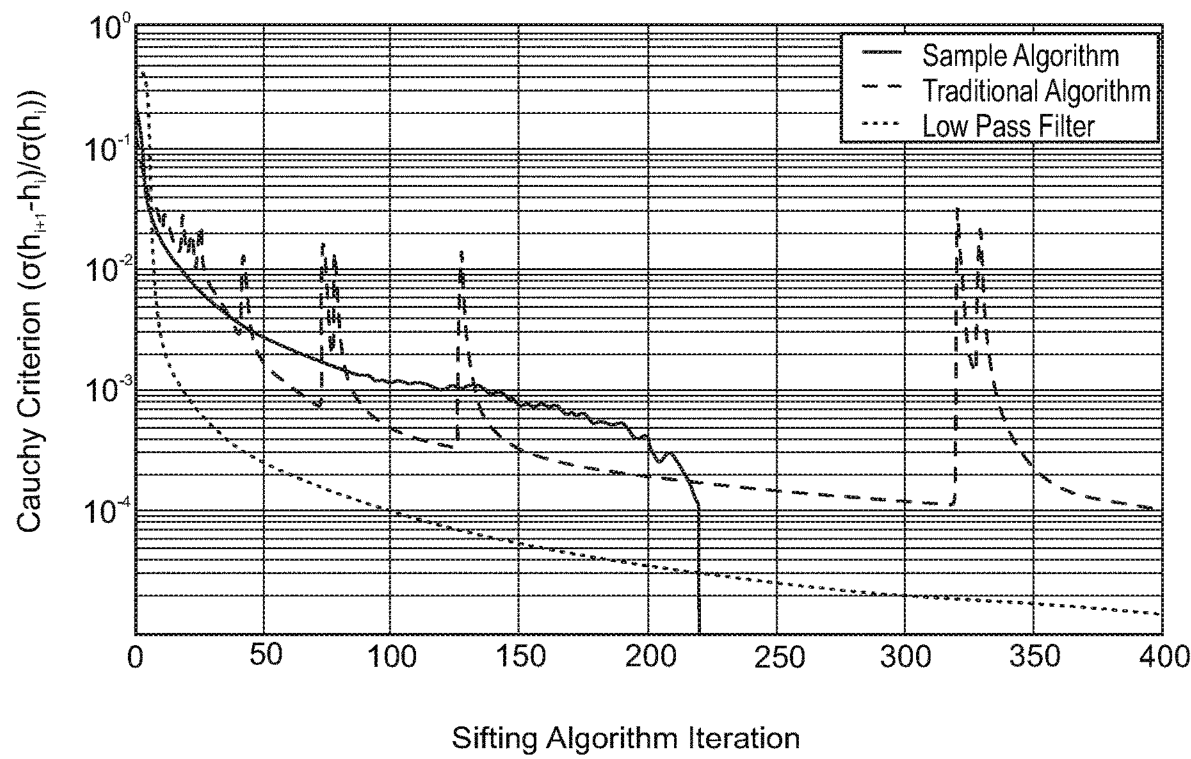
FIG. 19 is a Cauchy criterion as a function of iteration number for the three sinusoid signal $IMF_0$.
Figure 20:
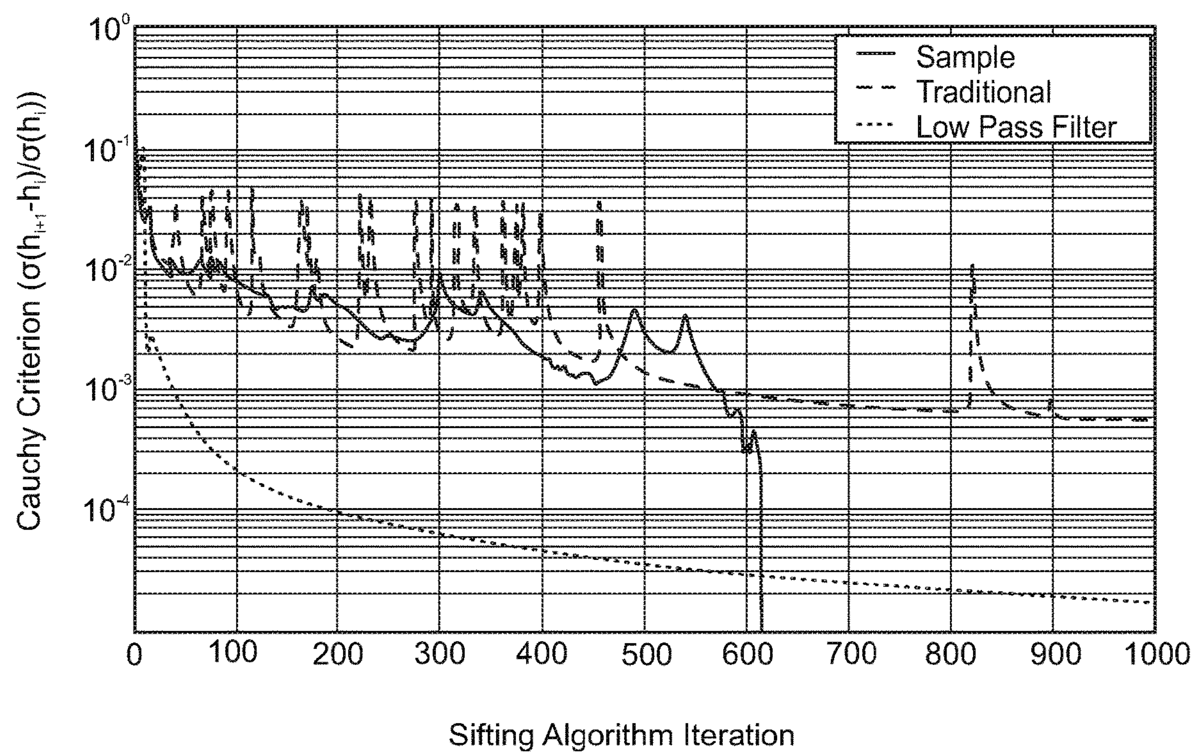
FIG. 20 is a Cauchy criterion as a function of iteration number for the three sinusoid signal $IMF_4$.
Figure 21:
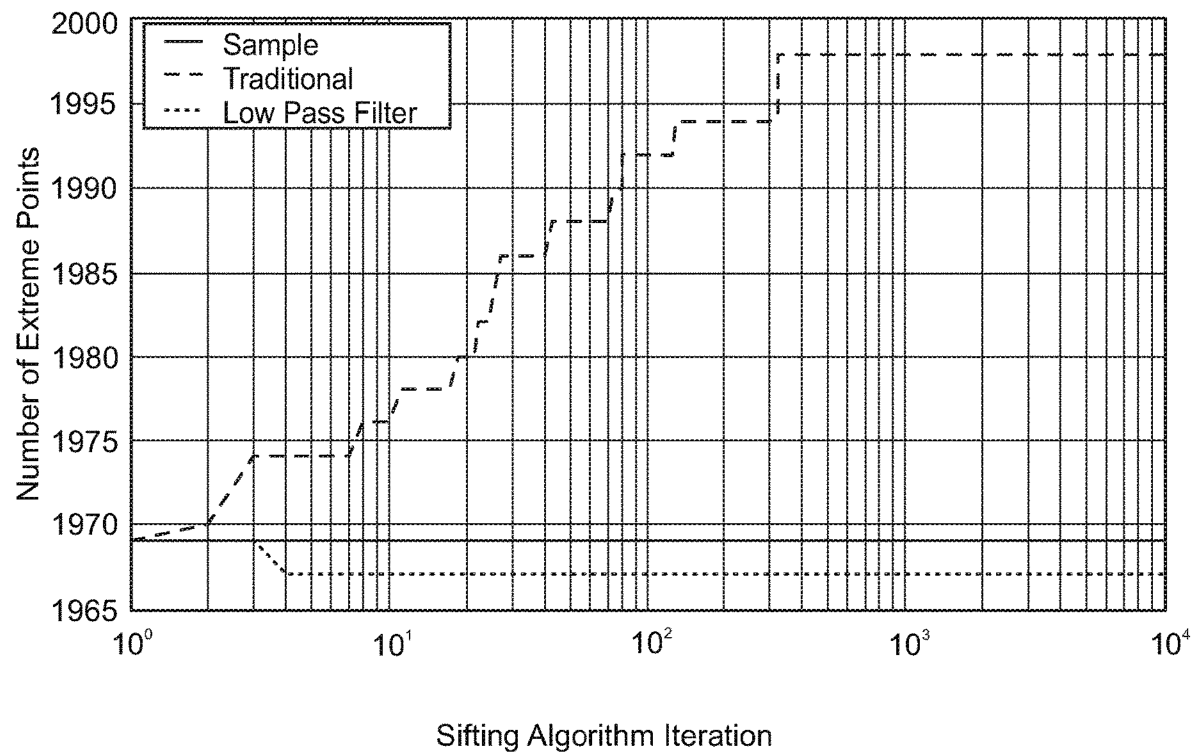
FIG. 21 is a graph showing the number of extreme values as a function of iteration number for the three sinusoid signal $IMF_0$.

FIG. 19 and FIG. 20 show the measure of change, EQN. 1, for a sample, traditional and low-pass filter EMD methods as a function of the number of iterations of the Sifting Method performed. The high-pass filter EMD only used a single iteration. The data is shown for both $IMF_0$ and $IMF_4$. The low-pass filter halts before than the traditional method, although not before the sample method, depending upon the value of the Cauchy criterion at which is chosen to stop. By comparing the number of extrema to number of zero-crossings, the sample method finishes first, while the low-pass filter EMD and the traditional method finish within one iteration of each other, FIG. 21.

Figure 22:
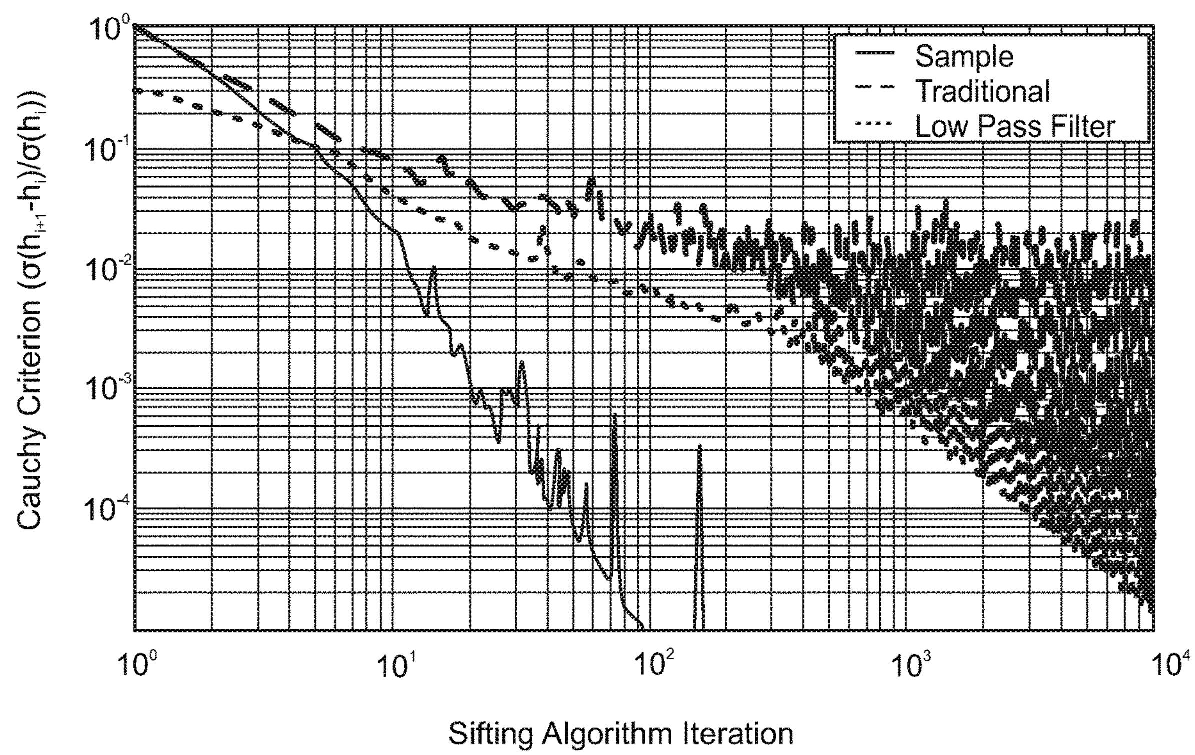
FIG. 22 is a Cauchy criterion as a function of iteration number for the acoustic signal $IMF_0$.
Figure 23:
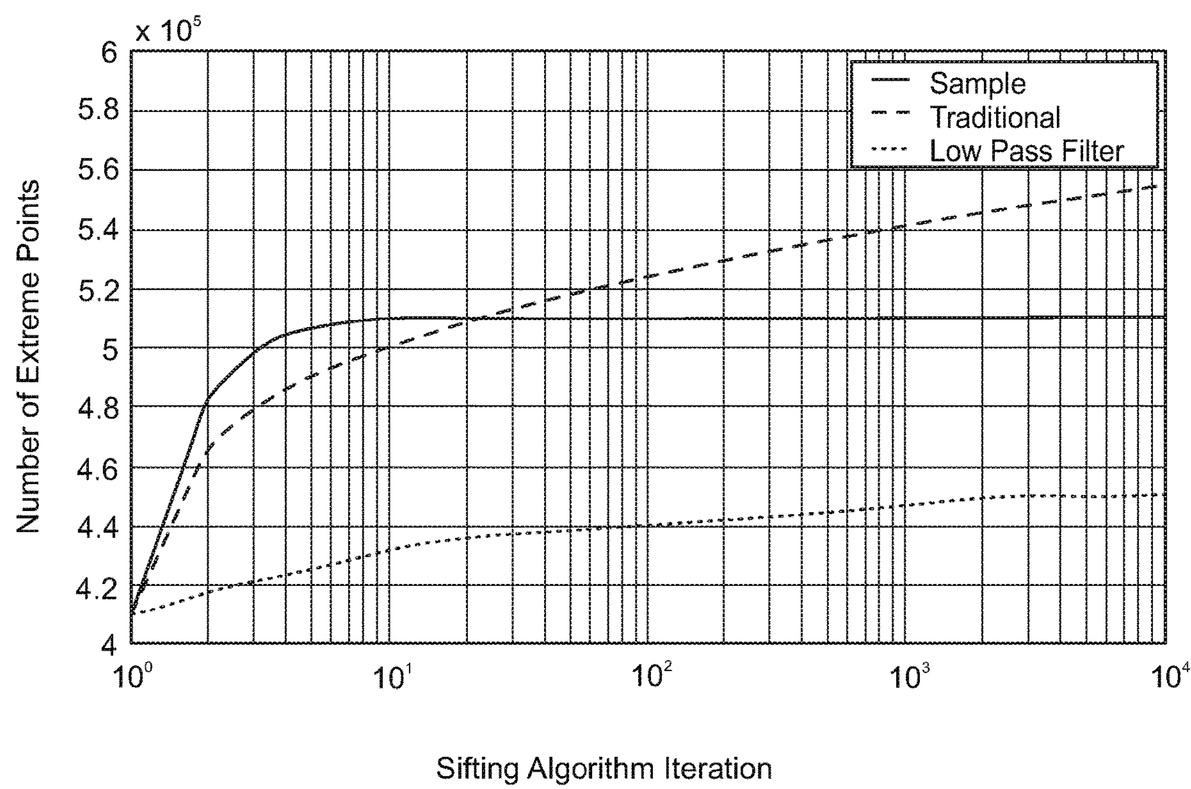
FIG. 23 is a graph showing the number of extreme values as a function of iteration number for the acoustic $IMF_0$.

The situation is similar when the methods are applied to the acoustic signal. The high-pass filter EMD stops after a single iteration, followed by the sample method, the low-pass filter method and finally the traditional method. This is true whether the Cauchy criterion is used, FIG. 22, or the extrema versus zero-crossing criteria, FIG. 23.

Figure 24:
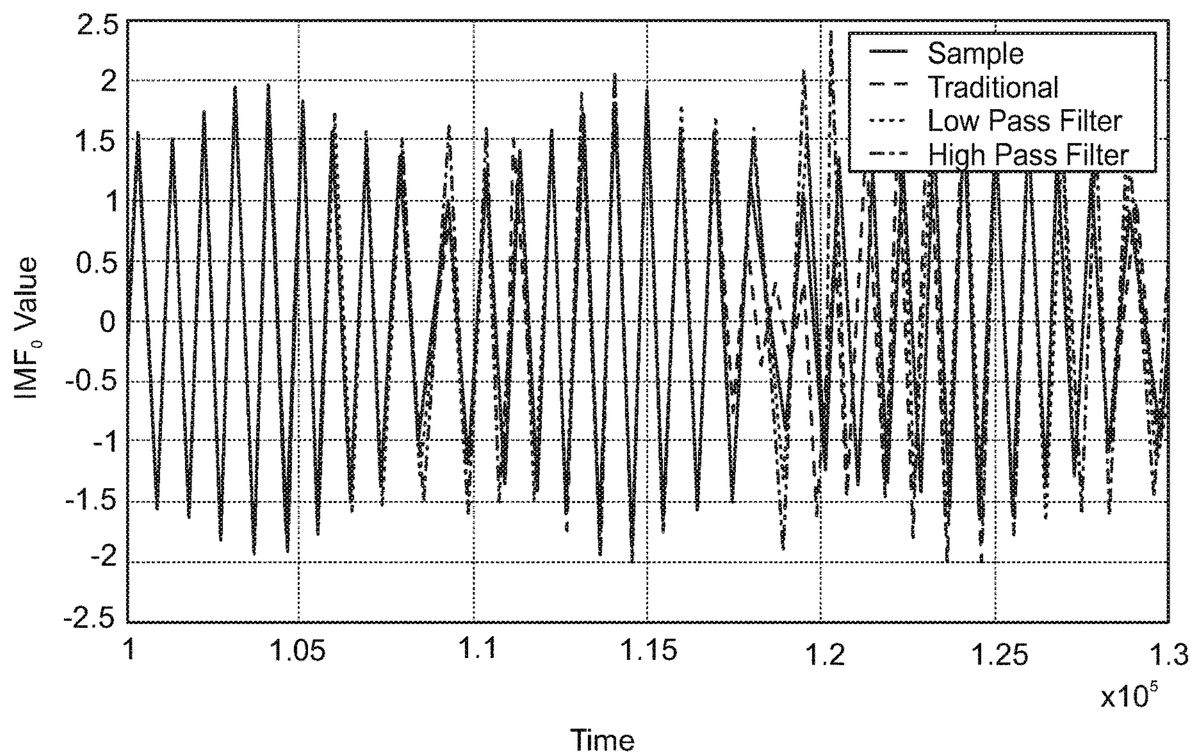
FIG. 24 is a graph showing the $IMF_0$ of the three sinusoid signal for the four EMD methods.
Figure 25:
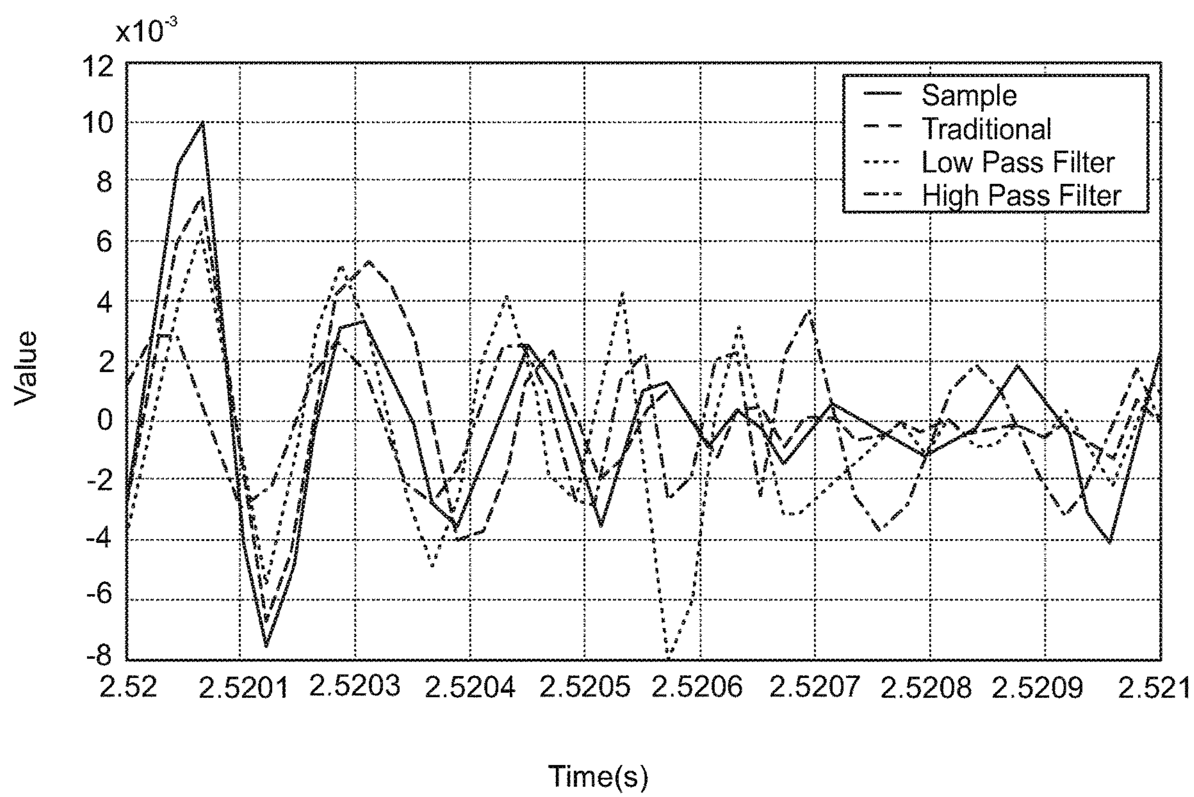
FIG. 25 is a graph showing the $IMF_0$ of the acoustic signal for the four EMD methods.

The actual IMFs returned by the methods differ. FIG. 24 shows $IMF_0$ of the three sinusoid signal for all of the methods, while FIG. 25 shows the same for the acoustic signal. There is not an established criterion for judging the correctness of the EMD method. Since the EMD does not use a set of orthogonal basis functions, there is no guarantee of uniqueness. This means that the correctness of the decomposition will have to be judged by each application. There may be many benefits to a filter-based EMD, including but not limited to, the particular characteristics pulled out of the function may be tailored by the characteristics of the filter used. In addition, the filter may be adapted from iteration to iteration to reinforce elements of interest and suppress items of no value.

The processor may be any processor known in the art. The speaker and microphone may be any speaker and microphone known in the art. In some embodiments, one or more hearing aid speakers are used.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system for processing audio signals comprising:

at least one speaker;

at least one microphone; and at least one processor, wherein the processor processes audio signals received using a method for phoneme identification comprising:

receiving an audio signal from a hearing aid speaker;

performing initial processing comprising filtering the audio signal to remove audio features, the initial processing resulting in a modified audio signal;

transmitting the modified audio signal to a phoneme identification method and a phoneme replacement method to further process the modified audio signal; and transmitting the modified audio signal to the hearing aid speaker.

2. The system of claim 1 wherein the processor produces an audio stream.

3. The system of claim 1 wherein the processor receives an audio signal from the at least one speaker and performs initial processing.

4. The system of claim 1 wherein the processing comprising filtering to remove noise.

5. The system of claim 1 wherein processing comprising filtering to remove audio features.

6. The system of claim 1 wherein the phoneme replacement method comprising a learning method comprising monitoring the audio signal and the background noise and providing feedback to a broadcast method.

7. The system of claim 1 further comprising a classification method for enhancing the accuracy of phoneme identification.

8. The system of claim 1 wherein the phoneme replacement method comprising:

a learning method comprising:

monitoring the audio signal and the background noise; and providing feedback to a broadcast method; and a broadcast method comprising:

enhancing the audio signal; and providing information to a classification method.

9. The system of claim 1 wherein the phoneme identification method comprising analyzing the modified audio signal using a Hilbert-Huang transform method.

10. The system of claim 1 wherein the phoneme identification method comprising identifying a time slot occupied by a phoneme and identifying the phoneme in the modified audio signal.

11. The system of claim 1 further comprising transmitting the time slot and the identified phoneme to the phoneme replacement method.

12. The system of claim 11 wherein the phoneme replacement method comprising determining whether the identified phoneme in the audio stream is a replaceable phoneme and, if the identified phoneme in the audio stream is a replaceable phoneme, replacing the identified phoneme in the modified audio signal with a replacement signal.

13. The system of claim 12 wherein replacing the identified phoneme comprising receiving the replacement signal from a table and determining a way to smoothly incorporate this sound into the modified audio signal.

14. The system of claim 13, replacing the identified phoneme further comprising transmitting the modified audio signal to the hearing aid speaker.

15. The system of claim 1 wherein filtering comprising digitally filtering the extreme values of the audio signal.

16. The system of claim 1 wherein the initial processing comprising:

processing the signal and finding the maxima and minima of the signal;

passing the maxima to a high-pass filter;

filtering the maxima using a high pass filter to produce a filtered signal;

sampling the filtered signal;

applying an interpolation function to the sampled filtered signal to find the values between the last point and the current point; and determining the difference between the sampled filtered signal and the signal.

* * * * *